(12) United States Patent
Chaoua et al.

(10) Patent No.: US 12,078,976 B2
(45) Date of Patent: *Sep. 3, 2024

(54) SYSTEMS AND METHODS FOR BUILDING ENERGY MANAGEMENT DURING POWER-LOSS EVENT

(71) Applicant: Schneider Electric Buildings Americas, Inc., Carrollton, TX (US)

(72) Inventors: Youcef Chaoua, Laval (CA); Maxime Joseph Frederic Marie Laudren, Montréal (CA)

(73) Assignee: Schneider Electric Buildings Americas, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,291

(22) Filed: May 15, 2023

(65) Prior Publication Data

US 2023/0280709 A1 Sep. 7, 2023

Related U.S. Application Data

(63) Continuation of application No. 17/135,572, filed on Dec. 28, 2020, now Pat. No. 11,693,379.

(Continued)

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC ........... G05B 19/042; G05B 2219/2639; H02J 2310/60; H02J 2310/52; H02J 2310/12; H02J 9/005; H02J 9/062

See application file for complete search history.

(56) References Cited

U.S. PATENT DOCUMENTS

| | | |
|---|---|---|
| 8,674,823 B1 | 3/2014 | Contario et al. |
| 11,202,007 B1 * | 12/2021 | Dhanda .................. H04N 23/65 |

(Continued)

FOREIGN PATENT DOCUMENTS

WO 2016004109 A1 1/2016

OTHER PUBLICATIONS

Extended European Search Report for EP Application No. 20217443 issued on Jun. 1, 2021, 8 pages.

(Continued)

*Primary Examiner* — Chad G Erdman
(74) *Attorney, Agent, or Firm* — Locke Lord LLP

(57) ABSTRACT

Methods and systems for managing energy consumption during a power-loss event provide a backup power unit that can notify electronic devices of a switch to backup power. The electronic devices can then automatically minimize power consumption upon receiving such notification. The notification can take the form of one or more signals indicative of a backup power operational state. The signals may be sent to the electronic devices over any suitable wired or wireless connection. Depending on the particular operational states, the electronic devices can take one or more predefined backup power handling actions, such as reducing device functionality, entering low-power mode, performing a controlled shutdown, and the like. The particular actions taken may depend on the type of devices, such that certain devices may have power consumption priority over other devices. The above arrangement provides an intelligent way to reduce overall energy consumption during a power-loss event.

20 Claims, 10 Drawing Sheets

Related U.S. Application Data

(60) Provisional application No. 62/955,420, filed on Dec. 31, 2019.

(56) References Cited

U.S. PATENT DOCUMENTS

| | | |
|---|---|---|
| 2002/0033692 A1 | 3/2002 | Sakai et al. |
| 2003/0101373 A1 | 5/2003 | Freyman |
| 2006/0041767 A1 * | 2/2006 | Maxwell et al. |
| 2006/0192434 A1 * | 8/2006 | Vrla .................. H02J 13/00009 307/64 |
| 2008/0114999 A1 | 5/2008 | Terry et al. |
| 2008/0195881 A1 | 8/2008 | Bernard et al. |
| 2012/0275084 A1 | 11/2012 | Familiant |
| 2013/0007515 A1 | 1/2013 | Shaw et al. |
| 2014/0217967 A1 | 8/2014 | Zeine et al. |
| 2016/0126783 A1 | 5/2016 | Cheng et al. |
| 2020/0386434 A1 | 12/2020 | Blair |

OTHER PUBLICATIONS

Extended Search Report for EP Application No. 20217443.9 dated Mar. 27, 2024, 7 pages.

* cited by examiner

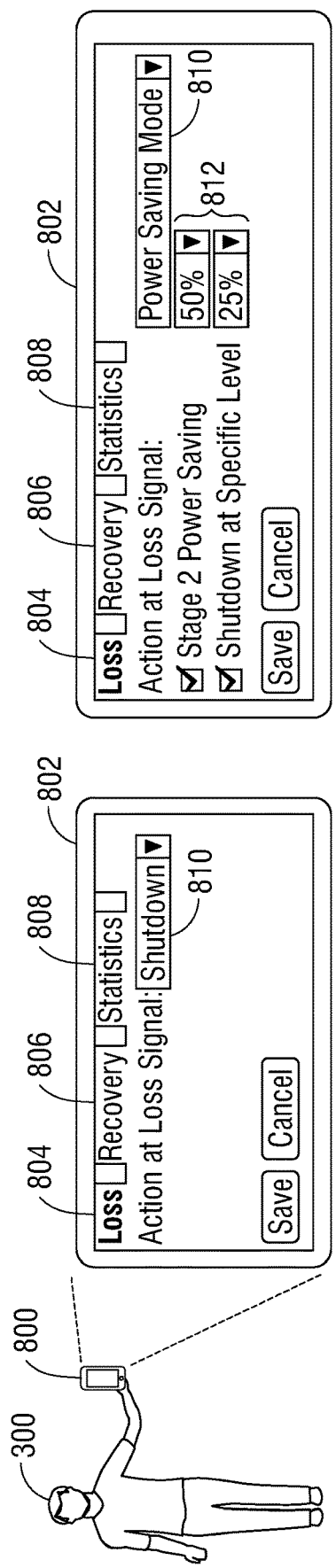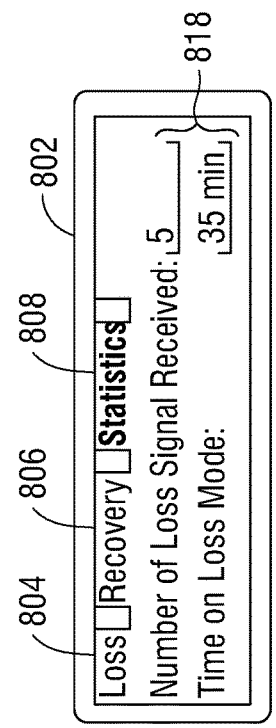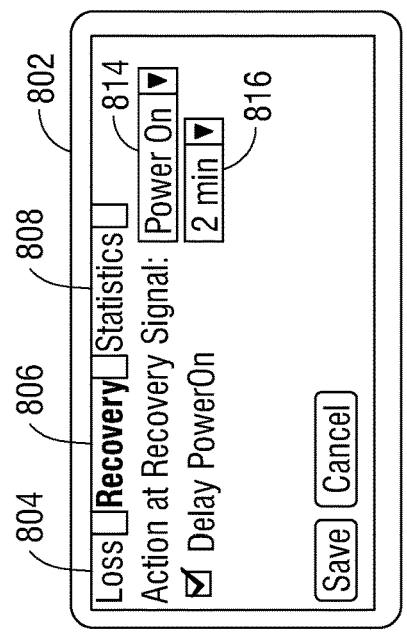
FIG. 8A
FIG. 8B
FIG. 8C
FIG. 8D

SYSTEMS AND METHODS FOR BUILDING ENERGY MANAGEMENT DURING POWER-LOSS EVENT

CROSS-REFERENCE TO RELATED APPLICATIONS

This application for patent is a continuation of U.S. Non-Provisional application Ser. No. 17/135,572, entitled "Systems and Methods for Building Energy Consumption Management during Power-Loss Event," filed Dec. 28, 2020, which claims the benefit of priority to U.S. Provisional Application No. 62/955,420, entitled "Building Energy Management During Power-Loss Event," filed Dec. 31, 2019, the foregoing applications being incorporated herein by reference in their entireties.

TECHNICAL FIELD

The present disclosure relates to automated management of a facility or building and, more particularly, to systems and methods for managing the energy consumption of electronic devices in the facility or building during a power outage or power-loss event.

BACKGROUND

A power outage or power-loss event can occur due to a variety of factors, including inclement weather, natural disasters, breakdowns at power stations and substations, damaged power transmission lines, overloaded circuits, short circuits, and other factors. A sudden power outage can cause disruptions to critical services, such as hospitals, water treatment plants, telecommunications services, and the like. Accordingly, most facilities and buildings as well as many homes have an emergency power source, such as a backup generator, that can provide emergency power during a power-loss event. The backup generator typically has a transfer switch that switches the facility, building, or home from main power, usually a public power grid, to the backup generator, and vice versa when main power is restored. This switch over to backup power is usually transparent to electronic devices and appliances, which continue to operate normally in the facilities, buildings, and homes.

SUMMARY

In general, in one aspect, embodiments of the present disclosure relate to a backup power optimization system. The method comprises, among other things, a backup power unit configured to provide backup electrical power during a power-loss event, and an electrical power line configured to distribute the backup electrical power from the backup power unit during the power-loss event. The method further comprises at least one electronic device connected to the electrical power line and configured to receive the backup electrical power provided by the backup power unit during the power-loss event. The backup power unit is operable to send a backup power signal indicative of an operational state of the backup power unit during the power-loss event, and the at least one electronic device is operable to perform one or more predefined backup power handling actions in response to receiving the backup power signal sent by the backup power unit, the one or more predefined backup power handling actions decreasing an amount of power consumed by the at least one electronic device.

In accordance with any one or more of the foregoing embodiments, the backup power unit is an uninterruptible power supply (UPS) or a backup generator, the backup power optimization system further comprising an electrical power distribution panel configured to receive the backup electrical power from the backup generator and provide the backup electrical power to the electrical power line.

In accordance with any one or more of the foregoing embodiments, the backup power unit sends the backup power signal over the electrical power line or a connection other than the electrical power line.

In accordance with any one or more of the foregoing embodiments, the backup power signal is indicative of one or more of the following operational states of the backup power unit: on, off, remaining backup power, remaining backup time, remaining battery capacity, and a backup priority level.

In accordance with any one or more of the foregoing embodiments, the one or more predefined backup power handling actions performed by the at least one electronic device includes one of reducing device functionality, entering low-power mode, and performing a controlled shutdown.

In accordance with any one or more of the foregoing embodiments, the one or more predefined backup power handling actions are defined on an individual device basis based on a device type of the at least one electronic device.

In general, in another aspect, embodiments of the present disclosure relate to a computer-readable medium storing computer-readable instruction thereon for causing an intelligent electronic device to optimize power consumption during a power-loss event. The computer-readable instructions cause the electronic device to, among other things, perform one or more device operations until it receives a backup power signal, and perform one or more predefined backup power handling actions in response to receipt of the backup power signal. The backup power signal indicates a power-loss event or a remaining power level at a backup power unit, and the one or more predefined backup power handling actions decrease an amount of power consumed by the electronic device.

In accordance with any one or more of the foregoing embodiments, the computer-readable instructions cause the electronic device to perform the one or more predefined backup power handling actions in response to the electronic device receiving the backup power from a backup power unit.

In accordance with any one or more of the foregoing embodiments, the computer-readable instructions cause the electronic device to perform the one or more predefined backup power handling actions in response to the electronic device receiving the backup power over one of: an electrical power line, or a connection other than the electrical power line.

In accordance with any one or more of the foregoing embodiments, the computer-readable instructions cause the electronic device to perform the one or more predefined backup power handling actions by performing one of: reducing device functionality, entering low-power mode, and performing a controlled shutdown.

In accordance with any one or more of the foregoing embodiments, the computer-readable instructions cause the electronic device to perform the one or more predefined backup power handling actions by performing backup power handling actions that are defined on an individual device basis based on a device type of the electronic device.

In general, in yet another aspect, embodiments of the present disclosure relate to an intelligent electronic device. The intelligent electronic device comprises, among other things, a processor configured to control operation of the electronic device, and a storage unit coupled to communicate with the processor, the storage unit storing computer-readable instructions thereon that, when executed by the processor, cause the electronic device to perform one or more device operations. The computer-readable instructions further cause the electronic device to perform one or more predefined backup power handling actions in response to receiving a backup power signal, the backup power signal indicating a power-loss event or a remaining power level at a backup power unit, and the one or more predefined backup power handling actions decreasing an amount of power consumed by the electronic device.

In accordance with any one or more of the foregoing embodiments, the electronic device receives the backup power signal from a backup power unit, or the electronic device receives the backup power signal over one of: an electrical power line, or a connection other than the electrical power line.

In accordance with any one or more of the foregoing embodiments, the one or more predefined backup power handling actions includes one of: reducing device functionality, entering low-power mode, and performing a controlled shutdown.

In accordance with any one or more of the foregoing embodiments, the one or more predefined backup power handling actions are defined on an individual device basis based on a device type of the electronic device.

In general, in still another aspect, embodiments of the present disclosure relate to a method of optimizing backup power during a power-loss event in a building. The method comprises, among other things, installing a backup power unit in the building, the backup power unit configured to provide backup electrical power during a power-loss event, and connecting an electrical power line in the building to distribute the backup electrical power from the backup power unit to at least one electronic device during the power-loss event. The method further comprises configuring the backup power unit to communicate a backup power signal to the at least one electronic device during the power-loss event, the backup power signal indicative of an operational state of the backup power unit during the power-loss event, and the at least one electronic device configured to perform one or more predefined backup power handling actions in response to receiving the backup power signal, the one or more predefined backup power handling actions decreasing an amount of power consumed by the at least one electronic device.

In accordance with any one or more of the foregoing embodiments, the backup power unit is an uninterruptible power supply (UPS) or a backup generator, and the method further comprises installing an electrical power distribution panel configured to receive the backup electrical power from the backup generator and provide the backup electrical power to the electrical power line.

In accordance with any one or more of the foregoing embodiments, configuring the backup power unit to communicate the backup power signal to the at least one electronic device comprises configuring the backup power unit to communicate the backup power signal over one of: the electrical power line, or a connection other than the electrical power line.

In accordance with any one or more of the foregoing embodiments, the method further comprises configuring the backup power unit to communicate the backup power signal so as to indicate one or more of the following operational states of the backup power unit: on, off, remaining backup power, remaining backup time, remaining battery capacity, and a backup priority level.

In accordance with any one or more of the foregoing embodiments, the one or more predefined backup power handling actions performed by the at least one electronic device includes one of the following: reduce device functionality, enter low-power mode, and perform a controlled shutdown.

In accordance with any one or more of the foregoing embodiments, the one or more predefined backup power handling actions performed by the at least one electronic device are defined on an individual device basis based on a device type of the at least one electronic device.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIGS. 8A-8D are schematic diagrams illustrating exemplary user interfaces for configuring intelligent backup power operations according to the present disclosure.

Identical reference numerals have been used, where possible, to designate identical elements that are common to the figures. However, elements disclosed in one embodiment may be beneficially utilized on other embodiments without specific recitation.

DETAILED DESCRIPTION

Care should be taken to minimize energy consumption during a power-loss event. The present disclosure relates to methods and systems for managing the energy consumption of electronic devices, such as in a facility, building, or home, during a power-loss event. The methods and systems provide a backup power unit, such as a backup generator or an uninterruptible power supply (UPS), that can notify the devices of a switch over to backup power. The devices can automatically minimize power consumption upon receiving such notification from the backup power unit. In some embodiments, the notification from the backup power unit can take the form of one or more signals indicating a backup power operational state, such as whether the backup power unit is on or off, remaining backup power, remaining backup time, remaining battery capacity, priority level, and the like. The operational state signals may be sent to the devices over any suitable wired or wireless connection, such as Wi-Fi, Bluetooth, LAN, Powerline Ethernet and other power cable protocols and systems, and the like. Depending on the particular operational states, the devices can take one or more predefined backup power handling actions, such as reducing device functionality, entering low-power mode, performing a controlled shutdown, and the like. The particular power handling actions taken by the devices may depend on device type, such that certain devices may have power consumption priority over other devices. The above arrangement provides an intelligent way to reduce overall energy consumption in the facility, building, or home while the backup generator and/or UPS is in operation, thereby optimizing backup power demand as well as improving backup power autonomy and automation.

Figure 1:
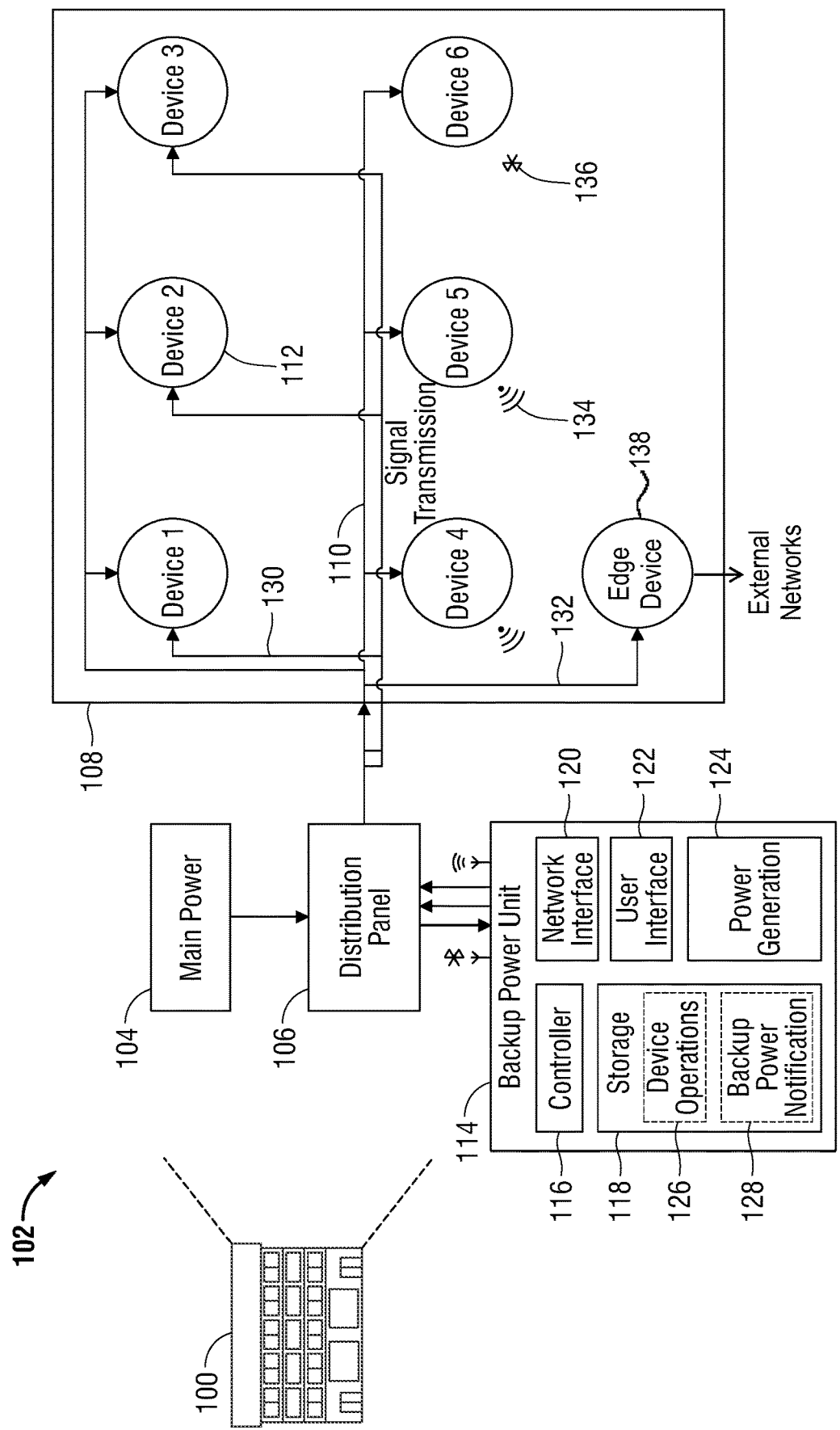
FIG. 1 is a schematic diagram illustrating an exemplary intelligent power distribution system for a building according to embodiments of the present disclosure.

Referring now to FIG. 1, an exemplary facility 100 is shown that employs a backup power optimization system 102 (and methods therefor) according to embodiments of the present disclosure. The facility 100 may be any facility where backup power is used during a power-loss event, such as an office building, an industrial plant, a residential home, and the like. These facilities 100 typically include various electronic devices, such as appliances, machinery, equipment, and the like, that rely on continuous electrical power from a main power source 104, usually a public power grid, to operate properly. An electrical distribution panel 106 is typically installed in the facility 100 to receive and distribute the power to a particular area 108 of the facility 100, such as a room, a wing, a floor, or any portion thereof, or even the entire facility itself in some cases. Power lines 110 extend throughout the area 108 to carry the power from the distribution panel 106 to one or more electronic devices 112, labeled as Devices 1-6 for reference, located around the area 108. A backup power unit 114 is installed to provide emergency power to the electronic devices 112 in the event of a power-loss event affecting power to the area 108.

In the FIG. 1 example, at least one electronic device 112 from among the Devices 1-6, and preferably all of them, are intelligent electronic devices. These intelligent devices 112 are capable of being programmed or otherwise configured to automatically or autonomously perform one or more operations related to the type of device. In an office building, for example, these devices 112 may include computers, printers, various building controllers (e.g., temperature, humidity, lighting, occupancy, etc.), and the like. In an industrial plant, these devices 112 may include sensors, control systems, various plant machinery and equipment (e.g., boilers, pumps, mixers, etc.), and the like.

In accordance with embodiments of the present disclosure, the backup power unit 114 is programmed or otherwise configured to send one or more backup power signals shortly after coming online, and each intelligent electronic device 112 is programmed or otherwise configured to perform one or more backup power handling actions in response to receiving the backup power signals sent by the backup power unit 114. The one or more backup power handling actions may vary from device to device, but generally have the effect of reducing the amount of power used by the devices 112, thereby minimizing the amount of emergency power consumed during a power-loss event. These devices 112 and the backup power unit 114 together form at least a part of the backup power optimization system 102 for the facility 100.

In some embodiments, the backup power unit 114 is a backup generator that uses a fuel source (e.g., gasoline, diesel, natural gas, etc.) to drive an alternator to convert mechanical energy into electricity. The backup generator 114 has a number of components that are generally shown here in block diagram form for convenience, including a controller 116, a storage unit 118, a network interface 120, a user interface 122, and a power generation unit 124. The components of the backup generator 114 are well understood and thus described only briefly here. In general, the controller 116 provides overall operational control of the backup generator 114, including load management, motor speed, power output, and the like, while the storage unit 118 stores operational software and data 126 used by the controller 116. The network interface 120 allows the backup generator 114 to communicate with external devices, such as the electronic devices 112, while the user interface 122 allows users to interact with the backup generator 114. The power generation unit 124, as the name suggests, generates the electricity provided by the backup generator 114, typically using the alternator mentioned above.

A backup power notification module 128, or rather the computer-readable instructions therefor, resides in or may be downloaded to the storage unit 118. This backup power notification module 128, when executed by the controller 116, causes the backup generator 114 to send one or more backup power signals via the network interface 120 to external devices, including the electronic devices 112. The backup generator 114 may send the backup power signals to the electronic devices 112 over any suitable wired and wireless connections, such as standard Ethernet (130), Powerline Ethernet and other power cable protocols and systems (132), Wi-Fi (134), and Bluetooth (136), among others. Where wireless connections are used, the wireless transmissions of the backup power signals to the electronic devices 112 can occur through a router 138 that is also powered by the backup generator 114 during a power-loss event. The wireless electronic devices 112 may interconnect, interact, and share data with one another over the wireless connections in a networked environment often referred to as the Internet of Things (IoT). The router 138 may be an edge device 138 that allows the electronic devices 112 and the backup power generator 114 to connect to external systems and networks, such as the Internet and the Cloud. Examples of suitable devices that may be used as the edge device 138 include gateways, routers, aggregators, switches, integrated access devices (IADs), and various MAN and WAN access devices.

In some embodiments, each backup power signal contains or otherwise indicates one or more operational states of the backup generator 114. Such operational states may include whether the backup generator 114 is on or offline, remaining backup power (e.g., 95%, 50%, 5%, etc.), remaining backup time (e.g., 60 mins, 30 mins, 10 mins, etc.), and the like. Depending on the particular operational state the backup power signal indicates, the electronic devices 112 may perform a different backup power handling action, including reducing device functionality, entering low-power mode, performing a controlled shutdown, and the like. These backup power handling actions may be defined on an individual device basis according to the type and/or location (e.g., room, hallway, etc.) of the device 112. In a home, for example, gaming devices may perform a controlled shutdown, whereas lighting control devices may reduce functionality, and computing equipment may enter a low-power mode, upon receiving a backup power signal indicating that backup power has come online. Several devices of the same type and/or in the same location may be configured with the same actions.

In some embodiments, the operational states may take the form of a priority level, such as priority level 1, 2, 3, and so on, each priority level reflecting a preset level of remaining backup capacity. The electronic devices 112 may then be configured to perform a backup power handling action that depends on an importance of each device in the area 108 (as set by the user). In a hospital, for example, televisions may be configured as priority 1 devices, computing equipment may be configured as priority 2 devices, and life support equipment may be configured as priority 3 devices. Thus, while priority 1 devices may perform a controlled shutdown upon receiving a priority 1 backup signal, priority 2 devices may instead reduce device functionality, while priority 3 devices may continue normal operations, and the like.

Where the intelligent electronic devices 112 are connected to a networked environment like the Internet of Things (IoT), one or more of the devices 112 may perform backup power handling actions that prioritize the presence or absence of one or more other devices 112 on the networked environment. For example, upon receiving a backup power signal (e.g., 50% capacity, priority 2, etc.), computing equipment may be configured to immediately perform a controlled shutdown instead of entering a low-power mode if fire detection and suppression devices are present on the networked environment. The foregoing arrangements allow the backup power optimization system 102 to reduce in a controlled and intelligent manner the amount of emergency power consumed during a power-loss event affecting power to the area 108.

In some embodiments, instead of (or in addition to) operational states, the backup power signal may contain one or more explicit commands or instructions to the electronic devices 112. The commands or instructions may direct the electronic devices 112 to perform one or more specific backup power handling actions instead of allowing the electronic devices to decide. This arrangement allows the backup power generator 114 to exercise greater control over how the electronic devices 112 consume backup power, for example, according to the amount of backup power remaining.

It is also possible in some embodiments for the backup power generator 114 to send the backup power signal to an external system or network, such as the Cloud, via the edge device 138, for example, for tracking and monitoring purposes. The edge device 138 may then forward the backup power signal to the electronic devices 112, either directly or after further processing on the Cloud or other external system. The further processing may translate or transform the backup power signal into a message format that is more appropriate for the electronic devices 112, for example.

Figure 2:
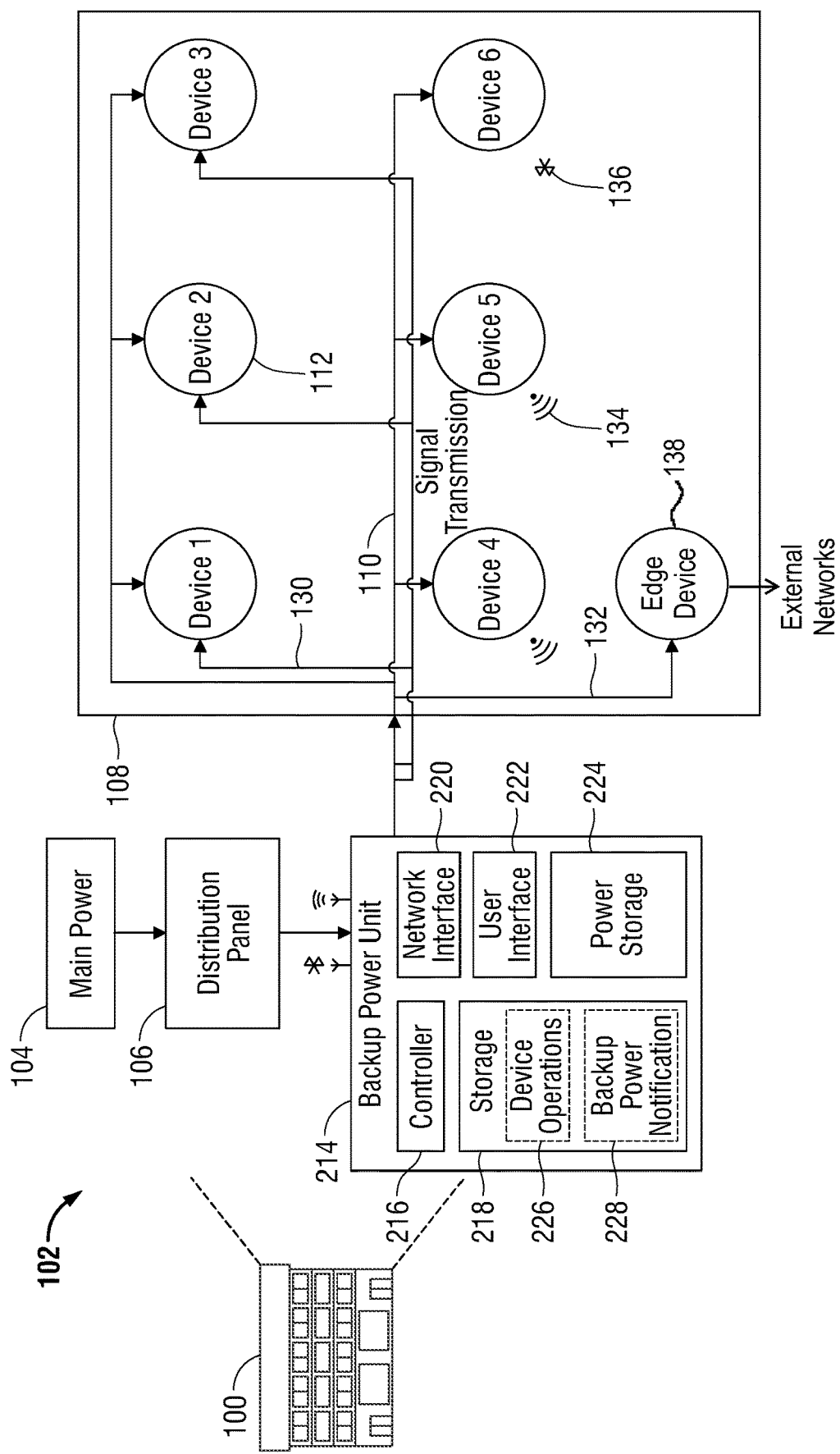
FIG. 2 is a schematic diagram illustrating another exemplary intelligent power distribution system for a building according to embodiments of the present disclosure.

FIG. 2 shows an alternative embodiment of the facility 100 in which the backup power optimization system 102 has an uninterruptible power supply (UPS) 214 installed instead of the backup generator 114. The UPS 214 has many of the same components as the backup generator 114, including a controller 216, a storage unit 218, a network interface 220, and a user interface 222. The storage unit 218 stores operational software and data 226 used by the controller 216 as well as a backup power notification module 228. The backup power notification module 228, when executed by the controller 216, causes the UPS 214 to send one or more backup power signals to external devices during a power-loss event. These components operate in a similar manner to their counterparts in the backup generator 114 and thus a description is omitted here for economy purposes. The main difference is, in the UPS 214, a power storage unit 224, typically one or more batteries, stores the power that the UPS 214 provides as emergency power during a power-loss event. The electronic devices 112 are then electrically connected to and receive power from the UPS 214, which is in turn electrically connected to and receives power from the main power source 104.

In some embodiments, instead of the backup generator 114 or the UPS 214 sending the one or more backup power signals, the backup power signals may be sent by an alternative component of the system 102. For example, the one or more backup power signals may be sent by the distribution panel 106, or the edge device 138, or a dedicated component designed to detect a power-loss event and send the one or more backup power signals to the electronic devices 112. This alternative component may be configured to receive (or obtain) the one or more operational states from the backup generator 114 or the UPS 214, then transmit the one or more operational states to the electronic devices 112.

Figure 3:
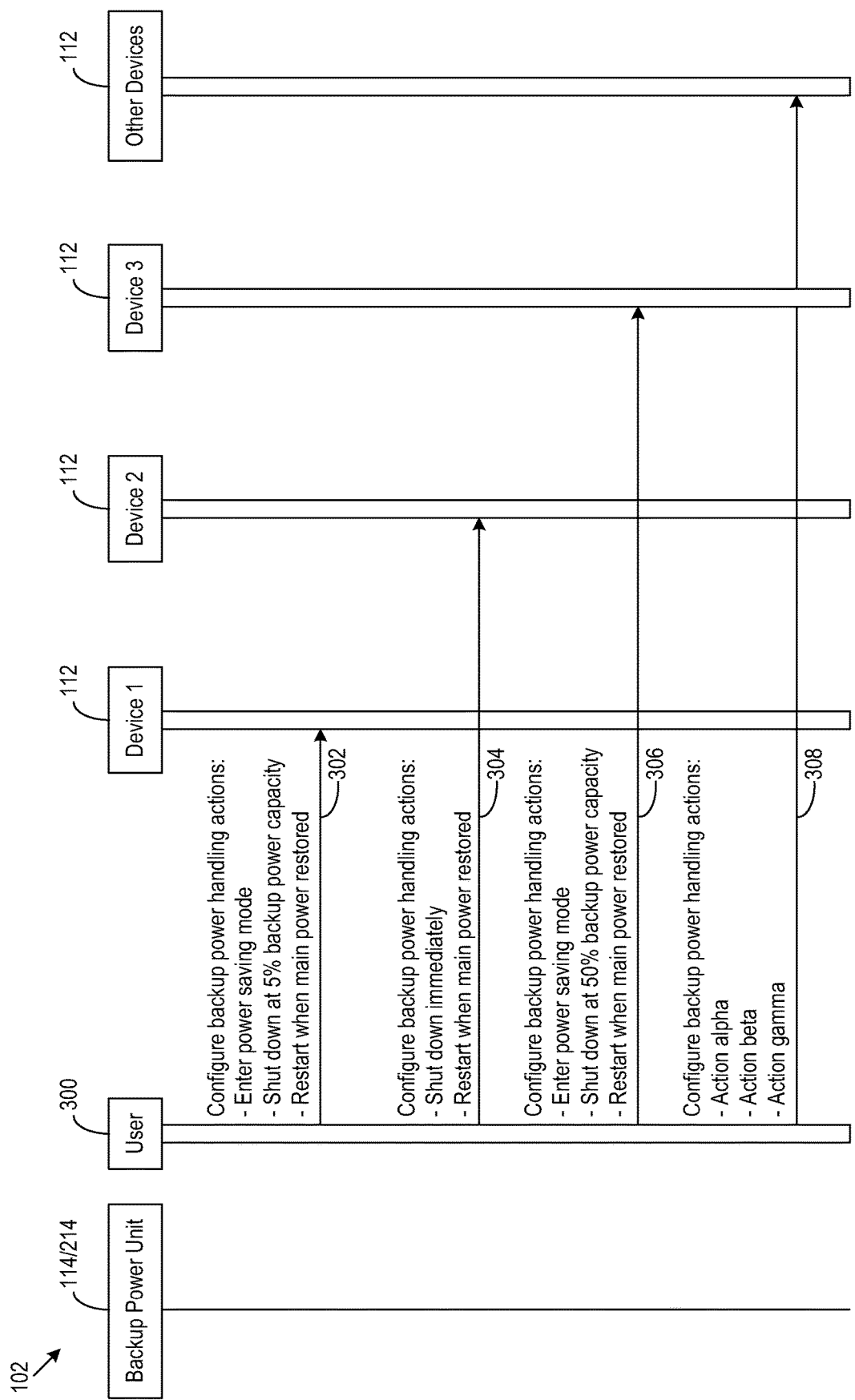
FIG. 3 is a sequence diagram illustrating exemplary device backup power configurations according to embodiments of the present disclosure.

FIG. 3 is an exemplary sequence diagram showing how a user 300 may configure the electronic devices 112 for operation when one or more backup power signals are received according to embodiments of the present disclosure. As can be seen, the user 300 may individually configure each device 112, for example, according to a device type and/or location of that device. At 302, for instance, the user 300 may configure Device 1 to enter a power saving mode upon receipt of an initial backup power signal, then do a controlled shutdown upon receipt of a backup power signal that indicates 5% backup power remaining, and restart upon receipt of a backup power signal that indicates main power is restored. At 304, on the other hand, the user 300 may configure Device 2 to perform a controlled shutdown upon receipt of an initial backup power signal, then restart upon receipt of a backup power signal that indicates main power is restored. At 306, the user 300 may configure Device 3 to first enter a power saving mode, then do a controlled shutdown upon receipt of a backup power signal that indicates 50% backup power remaining, and restart when main power is restored, and so on.

Figure 4:
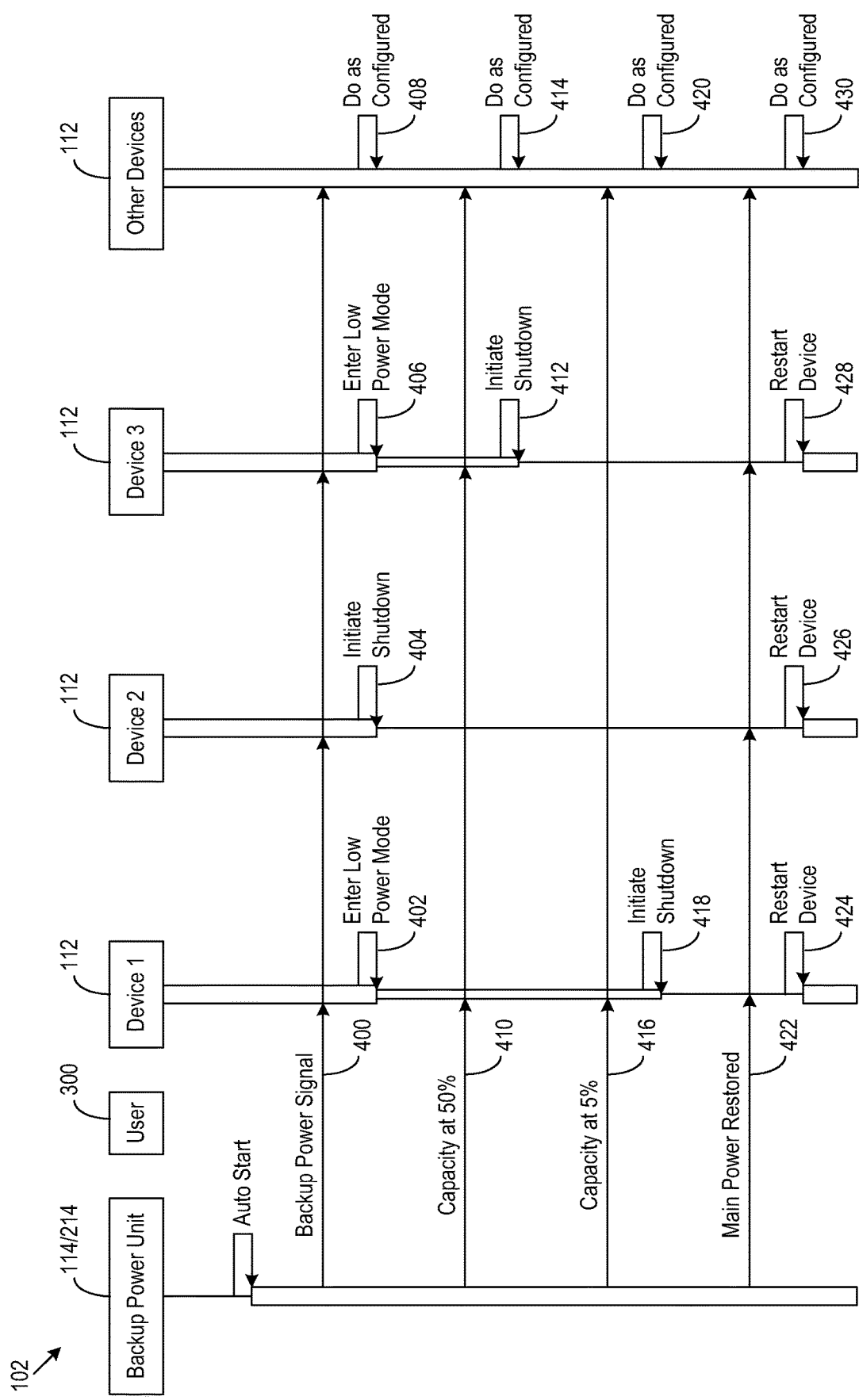
FIG. 4 is a sequence diagram illustrating exemplary device backup power operations according to embodiments of the present disclosure.

FIG. 4 is an exemplary sequence diagram showing operation of the electronic devices 112 when backup power signals are received from the backup power unit 114/214. Shortly after coming online either automatically or manually, the backup power unit 114/214 sends an initial backup power signal at 400 to the various devices 112 indicating that backup power is now on. In response to this initial backup power signal, Devices 1 and 3 enter low-power mode at 402 and 406, Device 2 initiates a controlled shutdown at 404, while other devices operate as configured at 408. When capacity of the backup power unit 114/214 falls to 50%, the backup power unit 114/214 sends a second backup power signal at 410 that indicates the reduced capacity. In response to this second backup power signal, Device 1 takes no action, Device 3 performs a controlled shutdown at 422, while other devices operate as configured at 414. When capacity of the backup power unit 114/214 drops to 5%, the backup power unit 114/214 sends a third backup power signal at 416 that indicates the further reduced capacity. In response to this third backup power signal, Device 1 performs a controlled shutdown at 418, while other devices operate as configured at 420. When main power is later restored, the backup power unit 114/214 sends a fourth backup power signal at 422 that indicates main power is back online. In response to this fourth backup power signal, Devices 1, 2, and 3 perform a restart at 424, 426, and 428, respectively, while other devices operate as configured at 430.

Figure 5:
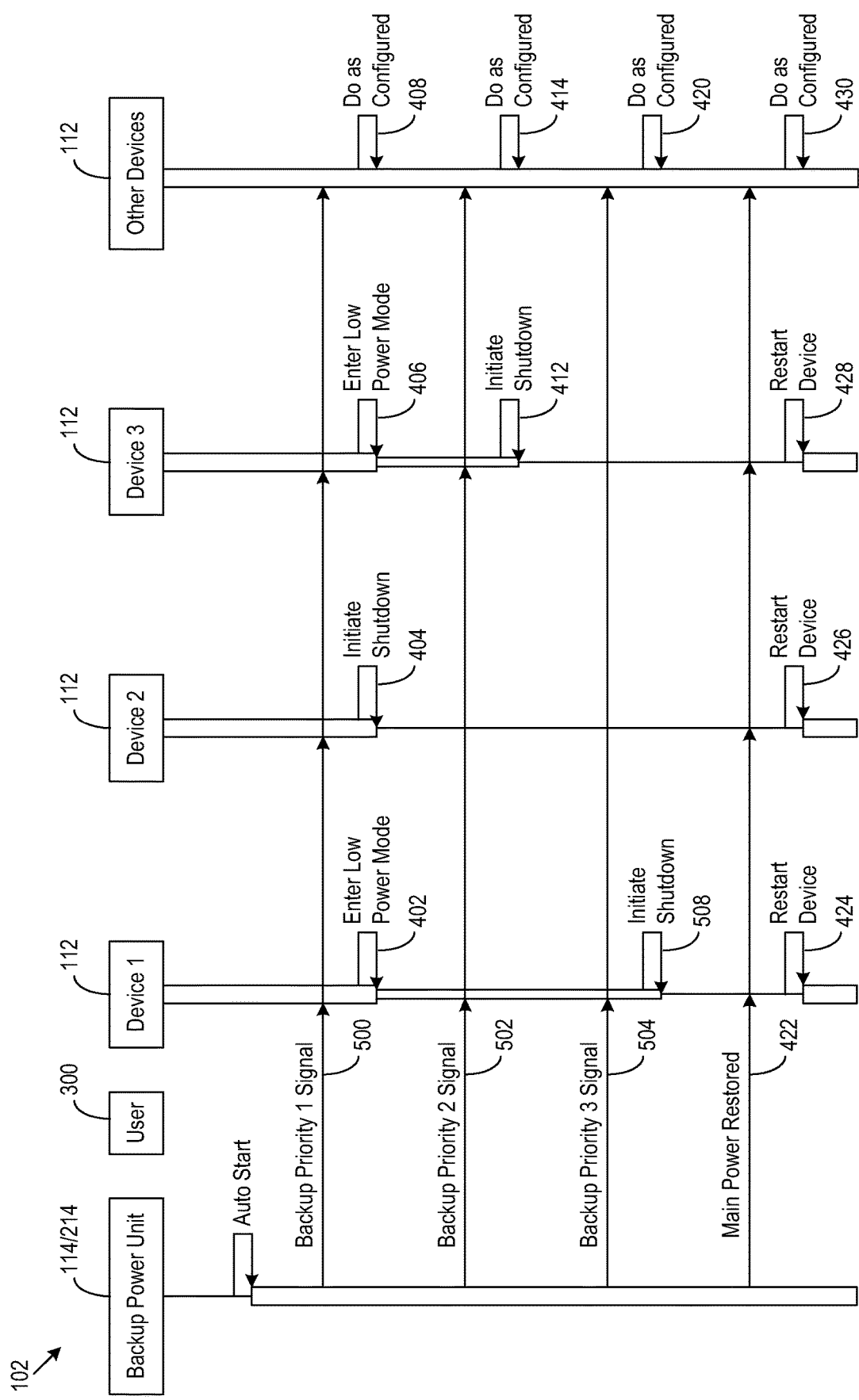
FIG. 5 is a sequence diagram illustrating alternative exemplary device backup power operations according to embodiments of the present disclosure.

FIG. 5 is an alternative sequence diagram showing operation of the electronic devices 112 when backup power signals are received from the backup power unit 114/214. In this example, the backup power signals indicate priority levels instead of operational states of the backup power unit 114/214. Thus, shortly after coming online either automatically or manually, the backup power unit 114/214 sends a priority 1 backup power signal at 500 to the various devices 112. This priority 1 signal may be equivalent to an indication that backup power is now on, so the responses of the devices 112 in this example may be similar to the responses for the initial backup signal in the example of FIG. 4. When capacity of the backup power unit 114/214 falls to a certain level, for example 50%, the backup power unit 114/214 sends a priority 2 backup power signal at 502. The responses of the devices 112 in this example may thus be similar to the responses for the second backup signal in the example of FIG. 4. When capacity of the backup power unit 114/214 drops to, for example 5%, the backup power unit 114/214 sends a priority 3 backup power signal at 504. The responses of the devices 112 in this example may thus be similar to the responses for the third backup signal in the example of FIG. 4, and so forth.

Figure 6:
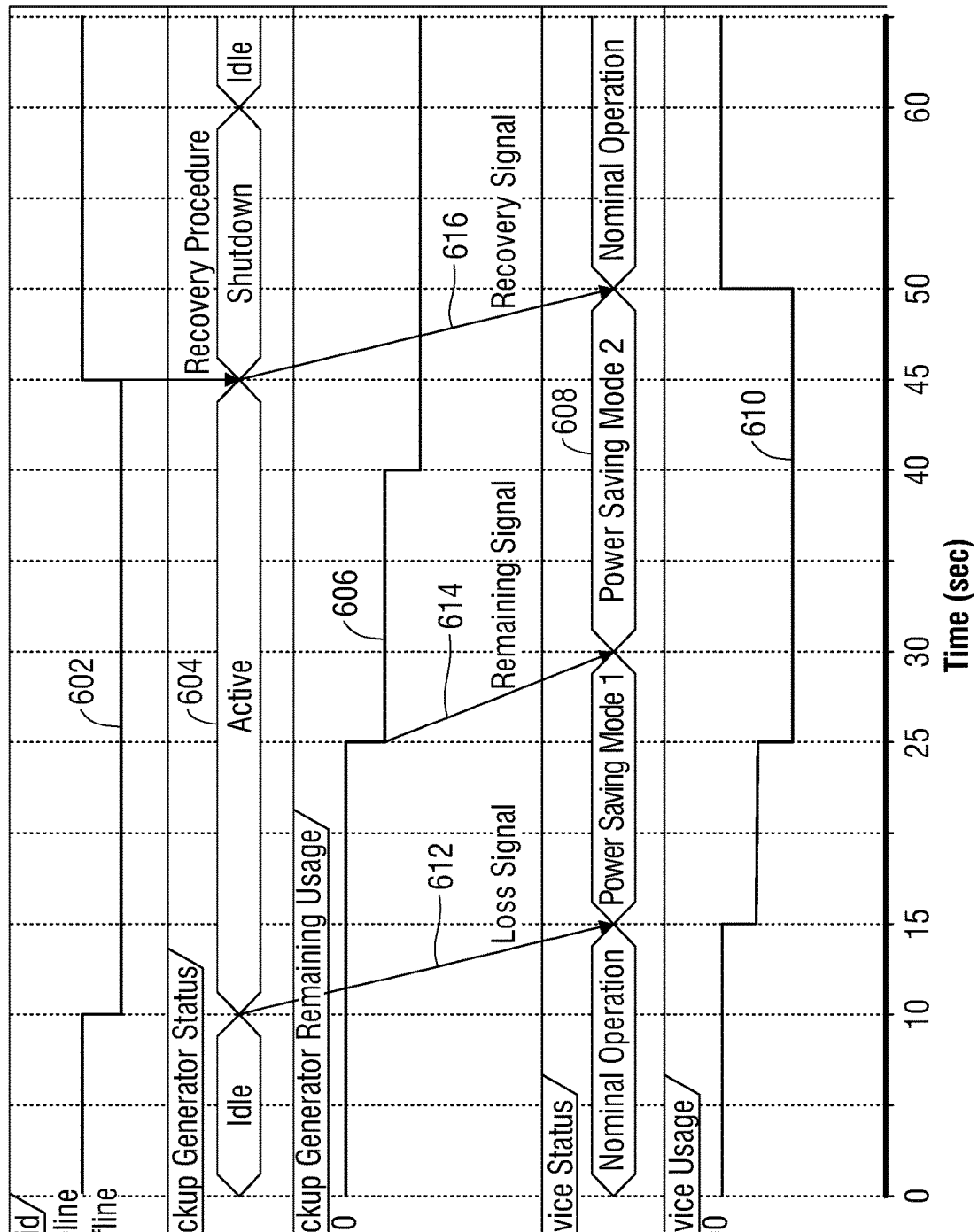
FIG. 6 is a timing diagram illustrating exemplary backup power optimization according to embodiments of the present disclosure.

An exemplary timing diagram showing backup power optimization is depicted in FIG. 6 at 600 according to embodiments of the present disclosure. In FIG. 6, the horizontal axis represents time in seconds, while the vertical axis shows the statuses of a main grid at 602, a backup generator at 604, backup generator capacity at 606, a device at 608, and device power usage at 610. As the figure shows, the main grid status 602 is initially online, while the backup generator status 604 is idle. During this time, the device status 606 is normal and the device power usage status 610 is about 100%.

At around 10 seconds, a power-loss event occurs and the main grid status 602 goes offline. This causes the backup generator status 604 to become active, with the backup generator capacity status 606 being about 100% at this time. Shortly thereafter, the backup generator sends a backup power signal 612 to the device indicating backup power is now online (i.e., main power has been lost). In response to receiving the backup power signal 612, the device reduces power consumption and the device status 608 enters a first power saving mode. In this mode, the device power usage status 610 drops to about 75% of normal usage.

At around 25 seconds, the backup generator capacity status 606 falls to about 75%. This causes the backup generator to send a second backup power signal 614 to the device indicating the decreased backup capacity. In response to receiving the second backup power signal 614, the device further reduces power consumption and the device status 608 enters a second power saving mode. In this mode, the device power usage status 610 drops further to about 50% of normal usage.

At around 40 seconds, the backup generator capacity status 606 falls further to about 50%, but no additional action is taken by the backup generator or the device, resulting in no change to the device status 608 or the device power usage status 610.

At around 45 seconds, the main grid is restored and the main grid status 602 comes back online. This causes the backup generator to send a third backup power signal 616 to the device indicating that backup power is now offline (i.e., main power has been restored). At this point, the backup generator shuts down and the backup generator status 604 becomes idle. In response to receiving the third backup power signal 616, the device exits the second power saving mode and the device status 608 resumes normal operation. The device power usage status 610 returns to about 100% of normal usage at this time.

Figure 7:
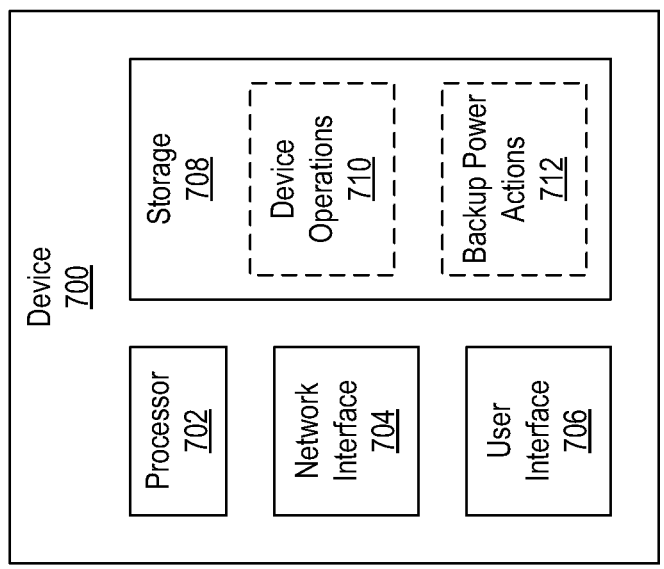
FIG. 7 is a block diagram illustrating an exemplary electronic device configured for intelligent backup power operations according to embodiments of the disclosure.

An exemplary device 700, or the architecture therefor, is shown in FIG. 7 in block diagram form. The device depicted is an intelligent electronic device 700 that can minimize power consumption upon receipt of one or more backup power signals according to embodiments of the present disclosure. In general, the intelligent device 700 has a processor 702, a network interface 704, a user interface 706, and a storage unit 708, among other components. The processor 702 is responsible for performing operations related to the type and functionality of the device 700, including complex data processing operations as well as simple sensing and control operations. The network interface 704 allows the device 700 to communicate with other devices, such as a backup power unit, both directly and over a network connection, while the user interface 706 allows a user to interact with the device 700. The storage unit 708 meanwhile stores operational software and data 710 used by the processor 702 to perform the device related operations mentioned above.

A backup power actions module 712, or more accurately the computer-readable instructions therefor, resides in or may be downloaded to the storage unit 708. The backup power actions module 712, when executed by the processor 702, allows a user to configure the device 700 to automatically perform one or more backup power handling actions upon receipt of the one or more backup power signals. The backup power handling actions may include one or more of the actions mentioned earlier (e.g., reducing device functionality, entering low-power mode, performing a controlled shutdown), among others. These backup power handling actions may be configured for the device 700 by the user on an individual device basis according to the type and/or location of the device in a given area (e.g., area 108).

Device configuration is detailed in FIGS. 8A-8D, which show examples of graphical user interfaces through which the user may interact with a device like the intelligent electronic device 700 to configure backup power handling actions. The graphical user interfaces may be presented directly on the device (e.g., on a built-in display thereof), or they may be provided as part of a device app running on a smart phone or tablet, or they may be accessed through a device web page via a web browser, or all of the above.

In the example of FIG. 8A, a user 300 uses a smart phone 800 to interact with a graphical user interface 802 to configure backup power handling actions for an intelligent electronic device like the device 700. The graphical user interface 802 in this example includes several tabs that the user 300 may select, including a power loss tab 804, a power recovery tab 806, and a power loss statistics tab 808. Selecting the power loss tab 804 presents the user with a drop-down menu 810 that lists several actions from which the user may choose. The user may then choose one of these actions for the device to perform upon receipt of a backup power signal indicating a loss of power.

In the example of FIG. 8B, the user has chosen for the device to enter a power saving mode from the drop-down menu 810 upon receipt of a backup power signal. Choosing this action presents the user with several additional options 812 from which the user may choose, including an option to have the device enter a second level power saving mode and an option to shut down, respectively, when backup power capacity reaches certain levels, as indicated by the backup power signals.

FIG. 8C shows an example of the power recovery tab 806. Selecting this power recovery tab 806 presents the user with a drop-down menu 814 listing several actions from which the user may choose for the device to perform when power is restored, as indicated by the backup power signal. In the example shown, the user has chosen for the device to perform a power-on action upon receipt of a backup power signal that indicates main power has been restored. Choosing this action presents the user with a second drop-down menu 816 that lists several optional power-on delay intervals from which the user may choose.

FIG. 8D shows an example of the power loss statistics tab 808. Selecting this tab 808 presents the user with data and information regarding power losses experienced by the device, as indicated at 818. Such information 818 may include the number of times the device has received a backup power signal indicating a power loss, the amount of time the device spent in power savings mode, and the like.

Thus far, exemplary embodiments have been described for a backup power optimization system, including backup power units and intelligent electronic devices, according to the present disclosure. Following now in FIGS. 9A-9B are exemplary methods that may be used to implement the backup power optimization system according to the present disclosure.

Figure 9A:
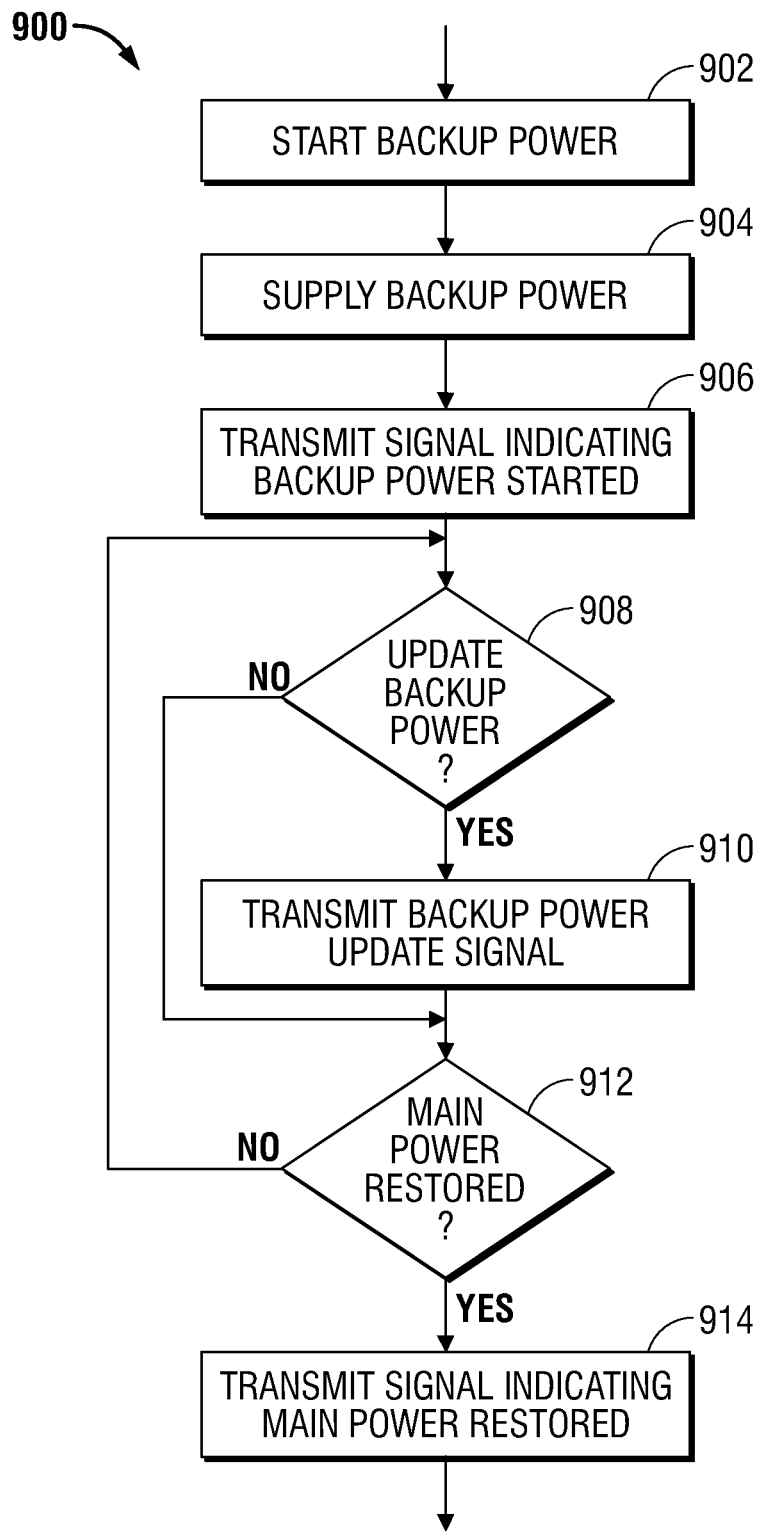
FIGS. 9A-9B are flow diagrams illustrating exemplary methods for intelligent backup power operations according to embodiments of the present disclosure.
Figure 9B:
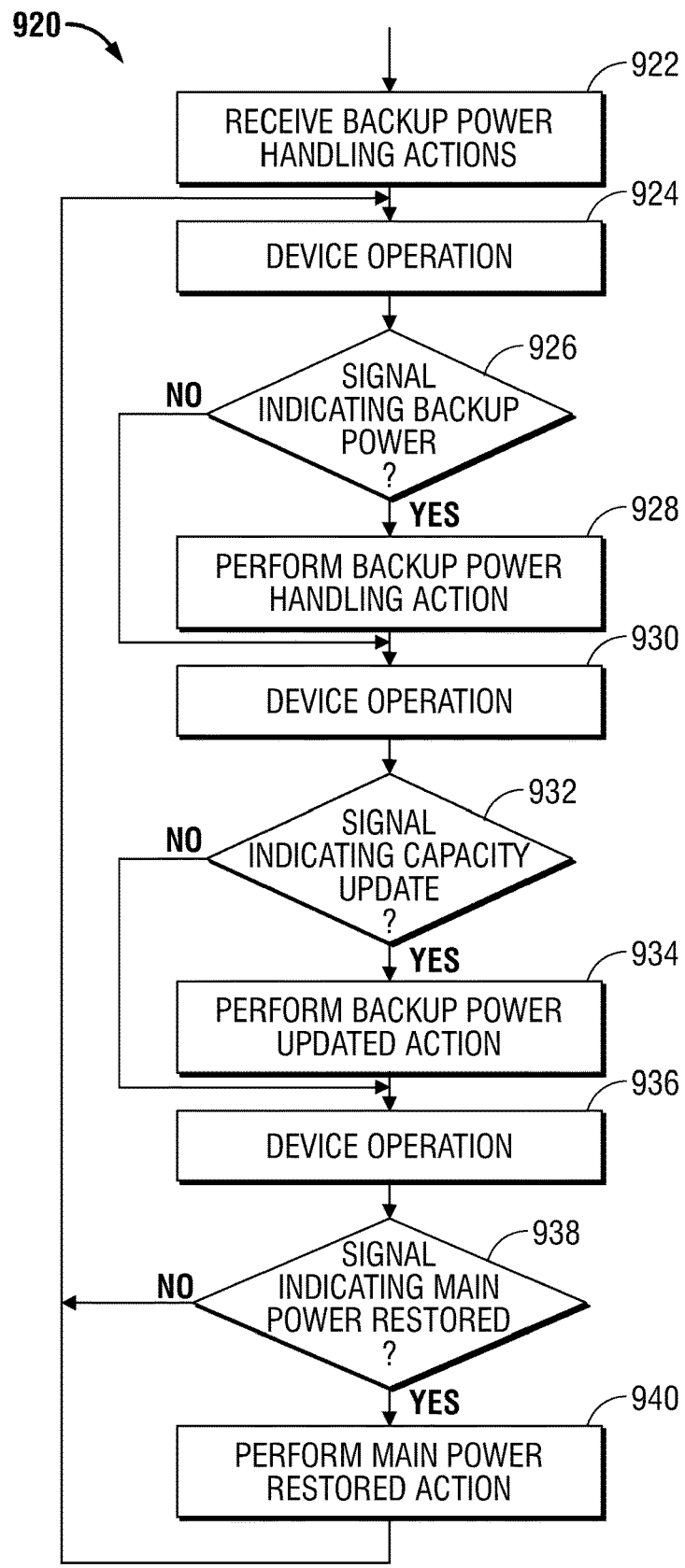

Referring to FIG. 9A, an exemplary flowchart is shown representing a method 900 that may be used with a backup power unit, such as a backup generator or a UPS, according to embodiments of the present disclosure. The method 900 generally begins at block 902, where the backup power unit is started, either automatically or manually by a user, upon occurrence of a power-loss event that requires activation of the backup power unit. At block 904, the backup power unit begins providing backup power to one or more electronic devices that are electrically connected to the backup power unit. At block 906, the backup power unit transmits a backup power signal to the electronic devices that indicates backup power has started. The backup power unit may send the backup power signals to the electronic devices over any suitable wired or wireless connections as described herein.

At block 908, the backup power unit determines whether a backup power capacity thereof has fallen sufficiently to warrant transmitting another backup power signal to update the electrical devices. The backup power unit may perform this determination by checking whether the backup power capacity has dropped to one or more predefined threshold levels, such as 50% capacity, 25% capacity, 5% capacity, and the like. If the determination is yes, then the backup power unit transmits another backup power signal to the electrical devices to provide an update in the backup power capacity.

In some embodiments, the backup power signals contain or otherwise indicate one or more operational states of the backup power unit, such as whether the backup power unit is on or offline, remaining backup power, remaining backup time, and the like. In some embodiments, the backup power signals contain or otherwise indicate a priority level, such as priority 1, 2, 3, and the like, that reflects a remaining capacity of the backup power unit.

If the determination at block 908 is no, then the backup power unit proceeds directly to block 912 to determine whether main power has been restored. If this determination is yes, then the backup power unit transmits a backup power signal that indicates main power has been restored at block 914, and stops providing further backup power. If this determination is no, then the backup power unit returns to block 908 to check whether transmission of another backup power signal is needed.

FIG. 9B shows an exemplary flowchart representing a method 920 that may be used with an electronic device being powered by one of the backup power units herein according to embodiments of the present disclosure. The method 920 generally begins at block 922 where the electronic device receives or is otherwise configured with one or more backup power handling actions to be performed by the device upon receipt of one or more backup power signals. The backup power handling actions may be selected for the device by a user either directly or remotely through an app or a webpage during a device configuration process. These backup power handling actions may include shutting down in a controlled manner, reducing device functionality, entering a low power mode, and the like. After configuration, the device proceeds to operate or otherwise perform operations related to the type of device, such as data processing, sensing, monitoring, controlling, and the like, at block 924.

At block 926, the device determines whether a backup power signal has been received that indicates backup power has been brought online. If the determination is no, then the device proceeds to block 930 and continues to perform appropriate device operations. If the determination is yes, then the device performs a backup power handling action in accordance with the configuration of the device (block 922) at block 928. The device thereafter proceeds to block 930 to continue performing appropriate device operations.

At block 932, the device determines whether a backup power signal has been received containing or otherwise indicating an update in backup power capacity. If the determination is no, then the device proceeds to block 936 and continues to perform appropriate device operations. If the determination is yes, then the device performs a backup power handling action in accordance with the configuration of the device (block 922) at block 934. The device thereafter proceeds to block 936 to continue performing appropriate device operations.

At block 938, the device determines whether a backup power signal has been received that indicates main power has been restored. If the determination is no, then the device returns to block 924 and continues to perform appropriate device operations. If the determination is yes, then the device performs a main power restored action in accordance with the configuration of the device (block 922) at block 940. The device thereafter proceeds to block 924 to continue performing appropriate device operations.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A backup power optimization system, comprising:
an uninterruptible power supply (UPS) configured to provide backup electrical power during a power-loss event;
an electrical power line connected to the UPS and configured to distribute the backup electrical power from the UPS during the power-loss event; and
a plurality of intelligent electronic devices connected to the electrical power line and configured to receive the backup electrical power provided by the UPS during the power-loss event;
wherein the UPS is operable to send a backup power signal indicative of an operational state of the UPS to the plurality of intelligent electronic devices during the power-loss event;
wherein the plurality of intelligent electronic devices is operable to perform one or more predefined backup power handling actions in response to receiving the backup power signal, the one or more predefined backup power handling actions decreasing an amount of power consumed by at least one electronic device of the plurality of intelligent electronic devices, at least two of the electronic devices of the plurality of intelligent electronic devices performing different predefined backup power handling actions relative to one another that decrease the amount of power consumed by different amounts relative to one another for a given operational state of the UPS;
wherein the one or more predefined backup power handling actions are defined on an individual device basis via a graphical user interface that allows a user to interact with the electronic devices to configure the one or more predefined backup power handling actions; and
wherein the UPS is further operable to send the backup power signal over the electrical power line.

2. The system of claim 1, wherein the UPS includes a power storage unit and the backup electrical power is provided from the power storage unit during the power-loss event.

3. The system of claim 2, wherein the power storage unit includes one or more batteries configured to store power and the backup electrical power is provided from the one or more batteries during the power-loss event.

4. The system of claim 1, wherein the backup power signal includes any one or more of: a backup priority level, or a command to enter low-power mode.

5. The system of claim 1, wherein the one or more predefined backup power handling actions performed by the plurality of intelligent electronic devices includes one of the following: reduce device functionality, enter low-power mode, and perform a controlled shutdown.

6. The system of claim 5, wherein the one or more predefined backup power handling actions are defined on an individual device basis based on a device type of a respective electronic device of the plurality of intelligent electronic devices.

7. A non-transitory computer-readable medium storing computer-readable instructions thereon for causing an intelligent electronic device of a plurality of intelligent electronic devices to optimize power consumption during a power-loss event, the computer-readable instructions causing the electronic device to:
- perform one or more device operations until the intelligent electronic device receives a backup power signal;
- receive the backup power signal over an electrical power line; and
- perform one or more predefined backup power handling actions in response to receipt of the backup power signal, the one or more predefined backup power handling actions decreasing an amount of power consumed by the intelligent electronic device;
- wherein the intelligent electronic device performs a different predefined backup power handling action relative to at least one other electronic device that decreases the amount of power consumed by a different amount relative to the at least one other electronic device upon receipt of the backup power signal, the at least one other electronic device also receiving the backup power signal over the electrical power line;
- wherein the predefined backup power handling action is defined on the intelligent electronic device via a graphical user interface for the intelligent electronic device that allows a user to interact with the intelligent electronic device to configure the predefined backup power handling action; and
- wherein the intelligent electronic device is configured to receive backup electrical power from an uninterruptible power supply (UPS) over an electrical power line during the power-loss event, the intelligent electronic device configured to receive the backup power signal which is configured to be received by the plurality of intelligent electronic devices during the power-loss event, the backup power signal indicative of an operational state of the UPS.

8. The non-transitory computer-readable medium of claim 7, wherein the computer-readable instructions cause the intelligent electronic device to perform another one of the one or more predefined backup power handling actions in response to the electronic device receiving a subsequent backup power signal.

9. The non-transitory computer-readable medium of claim 7, wherein the computer-readable instructions cause the intelligent electronic device to perform the one or more predefined backup power handling actions by performing one or more of: reducing device functionality, entering low-power mode, or performing a controlled shutdown.

10. The non-transitory computer-readable medium of claim 7, wherein the computer-readable instructions cause the intelligent electronic device to perform backup power handling actions that are defined on an individual device basis based on a device type of the intelligent electronic device.

11. An intelligent electronic device of a plurality of intelligent electronic devices, comprising:
- a processor configured to control operation of the electronic device; and
- a non-transitory storage unit coupled to communicate with the processor, the storage unit storing computer-readable instructions thereon that, when executed by the processor, cause the intelligent electronic device to perform one or more device operations;
- wherein the computer-readable instructions further cause the intelligent electronic device to receive a backup power signal and perform one or more predefined backup power handling actions in response to receiving the backup power signal, the one or more predefined backup power handling actions decreasing an amount of power consumed by the intelligent electronic device;
- wherein the intelligent electronic device performs a different predefined backup power handling action relative to at least one other electronic device that decreases the amount of power consumed by a different amount relative to the at least one other electronic device for a given operational state of an uninterruptible power supply (UPS), the at least one other electronic device also receiving the backup power signal;
- wherein the predefined backup power handling action is defined on the intelligent electronic device via a graphical user interface for the intelligent electronic device that allows a user to interact with the intelligent electronic device to configure the predefined backup power handling action; and
- wherein the intelligent electronic device is configured to receive backup electrical power from the UPS over an electrical power line during a power-loss event, the intelligent electronic device configured to receive the backup power signal which is configured to be received by the plurality of intelligent electronic devices during the power-loss event, the backup power signal indicative of an operational state of the UPS.

12. The intelligent electronic device of claim 11, wherein the intelligent electronic device receives the backup power signal from the UPS or an edge device.

13. The intelligent electronic device of claim 11, wherein the one or more predefined backup power handling actions includes one of: reducing device functionality, entering low-power mode, and performing a controlled shutdown.

14. The intelligent electronic device of claim 11, wherein the one or more predefined backup power handling actions are defined on an individual device basis based on a device type of the intelligent electronic device.

15. A method of optimizing backup power during a power-loss event in a building, comprising:
- installing an uninterruptible power supply (UPS) in the building, the UPS configured to provide backup electrical power during a power-loss event;
- connecting an electrical power line in the building to distribute the backup electrical power from the UPS to a plurality of intelligent electronic device during the power-loss event;
- configuring the UPS to communicate a backup power signal to the plurality of intelligent electronic devices during the power-loss event, the backup power signal indicative of an operational state of the UPS during the power-loss event, and the plurality of intelligent electronic devices configured to perform one or more predefined backup power handling actions in response to receiving the backup power signal, the one or more predefined backup power handling actions decreasing an amount of power consumed by at least one of the plurality of intelligent electronic device, at least two of the plurality of intelligent electronic devices performing different predefined backup power handling actions relative to one another that decrease the amount of power consumed by different amounts relative to one another for a given operational state of the UPS; and configuring the UPS to send the backup power signal over the electrical power line;

wherein the one or more predefined backup power handling actions are defined on an individual device basis via a graphical user interface that allows a user to interact with the plurality of intelligent electronic devices to configure the one or more predefined backup power handling actions.

16. The method of claim 15, wherein the UPS includes a power storage unit and the backup electrical power is provided from the power storage unit during the power-loss event.

17. The method of claim 16, wherein the power storage unit includes one or more batteries configured to store power and the backup electrical power is provided from the one or more batteries during the power-loss event.

18. The method of claim 15, further comprising configuring the UPS to communicate the backup power signal so as to indicate a backup priority level.

19. The method of claim 15, wherein the one or more predefined backup power handling actions performed by the at least one intelligent electronic device includes one of the following: reduce device functionality, enter low-power mode, and perform a controlled shutdown.

20. The method of claim 15, wherein the one or more predefined backup power handling actions performed by the at least one intelligent electronic device are defined on an individual device basis based on a device type of the at least one intelligent electronic device.

* * * * *